United States Patent
Zhang et al.

(10) Patent No.: US 10,555,002 B2
(45) Date of Patent: Feb. 4, 2020

(54) LONG TERM REFERENCE PICTURE CODING

(71) Applicant: INTEL CORPORATION, Santa Clara, CA (US)

(72) Inventors: Ximin Zhang, San Jose, CA (US); Sang-Hee Lee, San Jose, CA (US); Dmitry E. Ryzhov, Moscow (RU)

(73) Assignee: Intel Corporation, Santa Clara, CA (US)

( * ) Notice: Subject to any disclaimer, the term of this patent is extended or adjusted under 35 U.S.C. 154(b) by 867 days.

(21) Appl. No.: 15/002,697

(22) Filed: Jan. 21, 2016

(65) Prior Publication Data

US 2017/0214938 A1   Jul. 27, 2017

(51) Int. Cl.
| | |
|---|---|
| *H04N 19/58* | (2014.01) |
| *H04N 19/126* | (2014.01) |
| *H04N 19/146* | (2014.01) |
| *H04N 19/177* | (2014.01) |
| *H04N 19/593* | (2014.01) |
| *H04N 19/70* | (2014.01) |

(52) U.S. Cl.
CPC .......... *H04N 19/58* (2014.11); *H04N 19/126* (2014.11); *H04N 19/146* (2014.11); *H04N 19/177* (2014.11); *H04N 19/593* (2014.11); *H04N 19/70* (2014.11)

(58) Field of Classification Search
None
See application file for complete search history.

(56) References Cited

U.S. PATENT DOCUMENTS

| | | | | |
|---|---|---|---|---|
| 2007/0199011 | A1* | 8/2007 | Zhang | H04N 19/61 725/1 |
| 2010/0135385 | A1 | 6/2010 | Park et al. | |
| 2014/0079119 | A1* | 3/2014 | Samuelsson | H04N 19/50 375/240.12 |
| 2014/0161422 | A1 | 6/2014 | Peng et al. | |
| 2015/0296206 | A1* | 10/2015 | Thirumalai | H04N 19/124 375/240.05 |
| 2015/0319460 | A1 | 11/2015 | Takahashi et al. | |

OTHER PUBLICATIONS

International Preliminary Report on Patentability for International Patent Application No. PCT/US16/65202, dated Aug. 2, 2018.
International Search Report and Written Opinion for International Patent Application PCT/US2016/065202, dated Mar. 22, 2017.

* cited by examiner

*Primary Examiner* — William C Vaughn, Jr.
*Assistant Examiner* — Joseph Daniel A Towe
(74) *Attorney, Agent, or Firm* — Green, Howard & Mughal LLP

(57) ABSTRACT

Techniques related to long term reference picture video coding are discussed. Such techniques include determining long term reference pictures for a sequence of pictures, adjusting the quantization parameters for the long term reference pictures based on temporal correlations for pictures temporally neighboring and including the long term reference pictures, and managing reference picture lists including the long term reference pictures.

22 Claims, 7 Drawing Sheets

LONG TERM REFERENCE PICTURE CODING

BACKGROUND

In compression/decompression (codec) systems, compression efficiency, video quality, and error resilience are important performance criteria. For example, visual quality and error resilience are important aspects of the user experience in many video applications and compression efficiency impacts the amount of memory storage needed to store video files and/or the amount of bandwidth needed to transmit and/or stream video content. For example, a video encoder compresses video information so that more information can be sent over a given bandwidth or stored in a given memory space or the like. The compressed signal or data may then be decoded via a decoder that decodes or decompresses the signal or data for display to a user. In most implementations, higher visual quality with greater compression is desirable.

Furthermore, long term reference pictures or frames are an important feature of video coding systems. For example, long term reference pictures may be used in the H.264/MPEG-4 advanced video coding (AVC) standard and the high efficiency video coding (HEVC) standard. Similar features, provided by so called golden frames may be included in the VP8 standard and the VP9 standard. Such long term reference pictures may be used for coding other pictures and they may provide resiliency in situations where data transfer losses may occur such as over network distributions or the like. Long term reference pictures may be stored at the decoder and used for picture prediction, recovery or the like until they are replaced by a subsequent long term reference picture.

The selection and management of long term reference pictures may provide subjective and objective improvements during encode and error resilience in the decoding process. Therefore, it may be advantageous to select and manage long term reference pictures to provide improved video coding. It is with respect to these and other considerations that the present improvements have been needed. Such improvements may become critical as the desire to compress and transmit video data becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
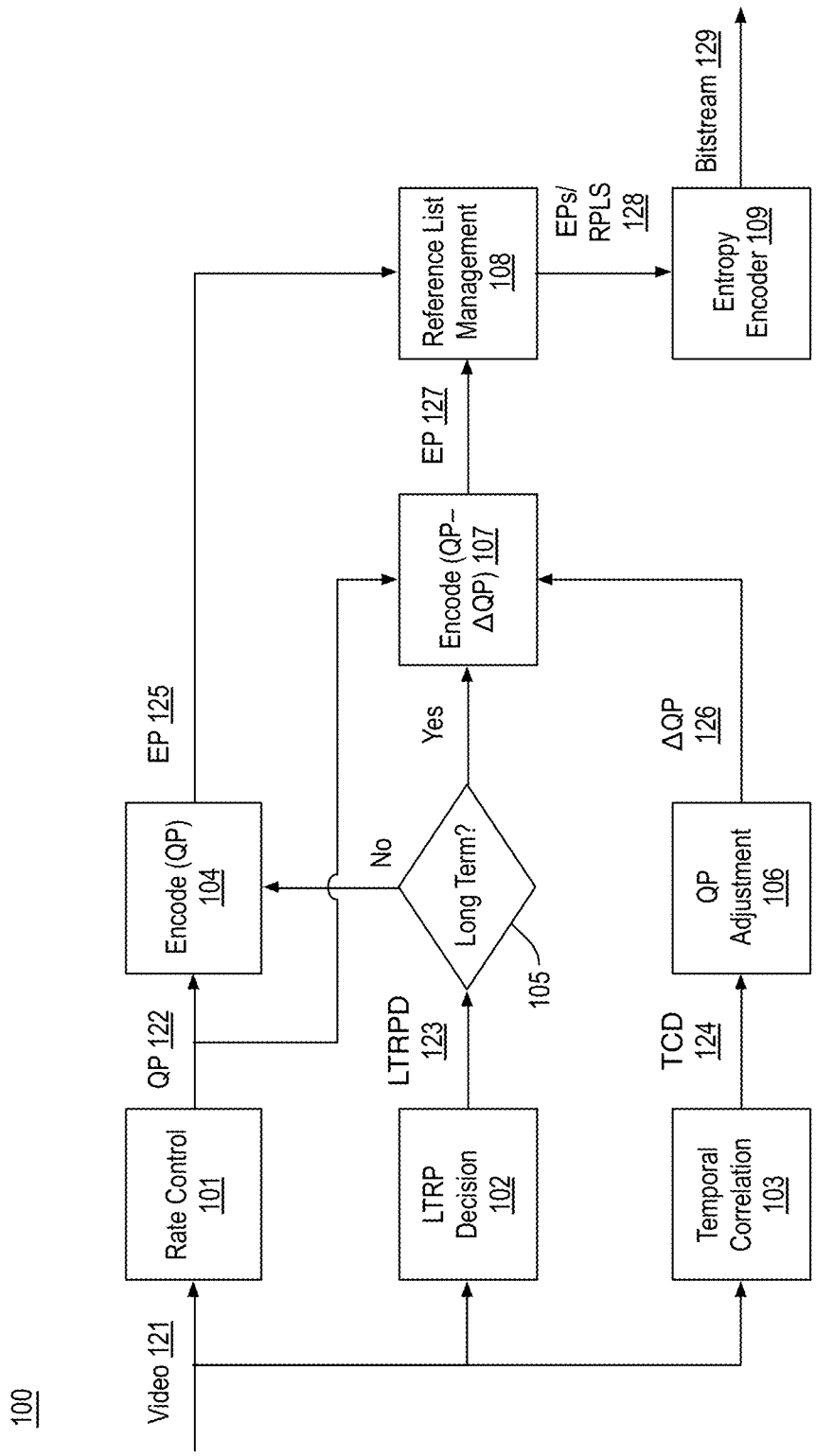
FIG. 1 is an illustrative diagram of an example system for providing video coding.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to video coding and, in particular, to long term reference picture coding.

As described above, selection and coding of long term reference pictures and management of long term reference pictures may be an important factor in subjective and objective improvements in video coding and in error resilience. As used herein, the term picture refers to any video picture or frame. Furthermore, the term long term reference picture refers to any long term reference frame, golden frame, or the like that may be maintained or kept as a reference frame or picture for several or more pictures or frames of a video sequence and/or for error recovery or resiliency.

In some embodiments discussed herein, long term reference pictures may be determined for a sequence of pictures of video. Such a determination may be based on the frame rate and group of pictures (GOP) coding structure of the video. For example, selecting the long term reference pictures may include assigning all intra-pictures of the sequence of pictures as long term reference pictures and/or assigning all detected scene change pictures of the sequence of pictures as long term reference pictures. In other examples, selecting the long term reference pictures may include assigning long term reference pictures at a predetermined interval.

For such a selected long term reference picture, a coding quantization parameter may be determined. The coding quantization parameter may, as the name suggests, be used to code the long term reference picture and the coding quantization parameter may be determined by adjusting a rate control based quantization parameter for the selected long term reference picture. For example, the rate control based quantization parameter may be determined using rate control techniques and the rate control based quantization parameter may be adjusted based on a temporal correlation corresponding to the selected long term reference picture such that if the selected long term reference picture has a greater temporal correlation the adjustment reduces the rate control based quantization parameter to generate the coding quantization parameter (e.g., such that the quality of the long term reference picture is increased). In some examples, an adjustment factor for determining the coding quantization parameter from the rate control based quantization parameter may be selected based on a ratio of a number of small motion blocks to a total number of blocks for pictures of the video and/or a prediction distortion cost for pictures of the video. For example, the adjustment factor may be subtracted from the rate control based quantization parameter to determine the coding quantization parameter. The selected long term reference picture may then be coded based on the coding quantization parameter.

Furthermore, a reference picture list syntax may be generated based on the long term reference pictures selected for the sequence of pictures of video. For example, upon coding a selected long term reference picture, the long term reference picture may be inserted into a short term reference picture list. In such instances, a previous long term reference picture may reside in a long term reference picture list. As coding continues, a coded picture or pictures may be inserted into the short term reference picture list. When the selected long term reference picture is replaced in the short term reference picture list, the selected long term reference picture may be inserted into the long term reference picture list. In some examples, a single backward looking short term reference picture list may be used. In such examples, the selected long term reference picture may be inserted into the long term reference picture list when it is replaced in the single backward looking short term reference picture list. In other examples, a backward looking short term reference picture list and a forward looking short term reference picture list (e.g., two short term reference picture lists) may be used. In such examples, the selected long term reference picture may be inserted into the long term reference picture list when it is replaced in both the backward and forward looking short term reference picture lists. For example, the reference picture list syntax may provide indicators or signals to indicate the reference pictures that are to be maintained during the coding of the sequence of pictures of video.

The coded individual long term reference picture and the reference picture list syntax may be inserted in a bitstream and transmitted to a receiving (decoding) device. The techniques discussed herein may provide long term reference picture selection, rate control for such long term reference pictures, and reference picture list management. Such techniques may be applied to any suitable coding structure or standard such as the H.264/MPEG-4 advanced video coding (AVC) standard, the high efficiency video coding (HEVC) standard, the VP8 standard, the VP9 standard, or the like. As described further herein, the location of long term reference pictures in a sequence of pictures may be decided, bits may be allocated among the long term reference pictures and other pictures, and reference picture lists (e.g., a long term reference picture list and one or two short term reference picture lists) may be managed.

FIG. 1 is an illustrative diagram of an example system 100 for providing video coding, arranged in accordance with at least some implementations of the present disclosure. As shown in FIG. 1, system 100 may include a rate control module 101, a long term reference picture (LTRP) decision module 102, a temporal correlation module 103, an encode module 104, a long term reference picture evaluation module 105 (e.g., labeled Long Term?), a quantization parameter (QP) adjustment module 106, an encode module 107, a reference list management module 108, and an entropy encoder 109.

Also as shown, rate control module 101, long term reference picture decision module 102, and temporal correlation module 103 may receive video 121. System 100 may provide, for example, video compression and system 100 may be a video encoder implemented via a computer or computing device or the like. For example, system 100 may generate a bitstream 129 that is compatible with a video compression-decompression (codec) standard such as the H.264/MPEG-4 advanced video coding (AVC) standard, the high efficiency video coding (HEVC) standard, the VP8 standard, the VP9 standard, or the like. System 100 may be implemented via any suitable device such as, for example, a personal computer, a laptop computer, a tablet, a phablet, a smart phone, a digital camera, a gaming console, a wearable device, a display device, an all-in-one device, a two-in-one device, or the like or platform such as a mobile platform or the like. For example, as used herein, a system, device, computer, or computing device may include any such device or platform.

System 100 may include other modules or components not shown for the sake of clarity of presentation. For example, system 100 may include a transform module, an intra prediction module, a motion estimation module, a motion compensation module, an in-loop filtering module, a reference frame buffer, a scanning module, or the like. In some examples, system 100 may include a local decode loop for generating reference frames used in the encoding process. Such modules are known to those of skill in the art and are not discussed further herein for the sake of clarity in presenting the described techniques.

As discussed, rate control module 101, long term reference picture decision module 102, and temporal correlation module 103 may receive video 121. Video 121 may include any suitable video frames, video pictures, sequence of video frames, group of pictures, groups of pictures, video data, or the like in any suitable resolution. For example, video 121 may be video graphics array (VGA), high definition (HD), Full-HD (e.g., 1080p), or 4K resolution video, or the like. Furthermore, video 121 may include any number of video frames, sequences of video frames, pictures, groups of pictures, or the like. Techniques discussed herein are discussed with respect to pictures and groups of pictures for the sake of clarity of presentation. However, such pictures and groups of pictures may be characterized as frames, video frames, sequences of frames, video sequences, or the like. Video 121 may also include a frame rate and/or a group of pictures (GOP) coding structure of video 121. The frame rate and GOP coding structure may be any suitable frame rate and GOP coding structure, examples of which are discussed further herein. The frame rate and GOP coding structure may be determined using any suitable technique or techniques. For example, the frame rate and GOP coding structure may be selected by a user or application or the like.

As shown in FIG. 1, rate control module 101 may determine, for individual pictures of video 121, a quantization parameter (QP) 122. For example, rate control module 101 may provide quantization parameter 122 to encode module 104 and/or encode module 107. As used herein, quantization parameter 122 may be characterized as a rate control based quantization parameter such that quantization parameter 122 is generated based on rate control methods. Such rate control methods may include any suitable technique or techniques. Quantization parameter 122 may be used to encode non-long term reference pictures via encode module 104 (e.g., as labeled Encode (QP) to generate an encoded picture (EP) 125 and quantization parameter 122 may be adjusted by an adjustment factor or delta QP (ΔQP) and the adjusted quantization parameter or coding quantization parameter (e.g., QP–ΔQP)) may be used to encode long term reference pictures via encode module 107 (e.g., as labeled Encode (QP–ΔQP)) to generate an encoded picture (EP) 127. Such a reduction of quantization parameter 122 to a reduced coding quantization parameter for long term reference pictures may provide for increased quality long term reference pictures and may thereby efficiently allocate bits between long term reference pictures and non-long term reference pictures.

Also as shown, long term reference picture decision module 102 may receive video 121 and long term reference picture decision module 102 may generate a long term reference picture decision (LTRPD) 123 for each picture of video 121. Long term reference picture decision module 102 may generate long term reference picture decision 123 using any suitable technique or techniques. In an embodiment, each intra picture of video 121 may be assigned as a long term reference picture such that long term reference picture decision 123 indicates all intra pictures of video 121 are long term reference pictures (e.g., via a bit or indicator or the like) and long term reference picture decision 123 indicates all non-intra pictures of video 121 are non-long term reference pictures (e.g., via a bit or indicator or the like). In the alternative or in addition, each scene change picture of video 121 may be assigned as a long term reference picture. In such examples, long term reference picture decision 123 may indicates all scene change pictures of video 121 are long term reference pictures (e.g., via a bit or indicator or the like). Such scene change pictures may be detected using any suitable technique or techniques. In an embodiment, the temporal correlation of an individual frame may be compared to a predetermined threshold such that if the temporal correlation is greater than the threshold, the individual frame is deemed to be a scene change frame.

In other embodiments, long term reference picture decision module 102 may assign or insert long term reference pictures with a fixed interval. For example, if the intra-picture interval of video 121 is less than (or does not exceed) a threshold, the intra-picture interval may be used as the fixed interval and intra-pictures or both intra-pictures and scene change pictures may be selected as long term reference pictures. The intra-picture interval threshold may be preset and may be any suitable value. In an embodiment, the intra-picture interval threshold is 1 second. If the intra-picture interval is greater than (or greater than or equal to) the intra-picture interval threshold, long term reference pictures may be assigned at a fixed interval or an interval that is a multiple of a GOP size of video 121 or the like. For example, for low delay (LD) coding a fixed interval such as every 1 second, every half-second, or the like may be used. For hierarchical B (HB) coding, the long term reference picture interval may be selected as a multiple of the GOP size of video 121. For example, if the GOP size is 4 pictures, the long term reference picture interval may be every 8, 16, 32, or 64 pictures. Similarly, if the GOP size is 8 pictures, the long term reference picture interval may be every 16, 32, or 64 pictures. In some examples, the long term reference picture interval may be determined based on multiplying the GOP size by a multiplier or factor such as two, four, eight, or sixteen, or the like. Although discussion has focused on integer multipliers or factors, the multiplier or factor may be a non-integer value such as 2.5 or the like.

As discussed, long term reference picture decision 123 may provide a signal of long term reference pictures and non-long term reference pictures in video 121. Such signaling may be performed using any suitable technique or techniques. As shown via long term reference picture evaluation module 105, if a picture of video 121 is a non-long term reference picture, the picture may be encoded via encode module 104 using quantization parameter 122.

If a picture of video 121 is a long term reference picture, as shown, the picture may be encoded via encode module 107 using a coding quantization parameter based on an adjustment of quantization parameter 122 (e.g., the rate control based QP for the picture) and an adjustment factor or delta QP (ΔQP). Such a reduction of the coding quantization parameter may provide a smaller QP for coding such that long term reference pictures have better quality to achieve better prediction for other pictures of video 121. For example, temporal correlation module 103 may receive video 121 and temporal correlation module 103 may generate temporal correlation data (TCD) 124 associated with at least long term reference pictures of video 121. Quantization parameter adjustment module 106 may receive temporal correlation data 124 and quantization parameter adjustment module 106 may generate an adjustment factor (ΔQP) 126 based on temporal correlation data 124, which may be deducted from quantization parameter 122 to generate a coding quantization parameter (e.g., QP−ΔQP) for coding the long term reference picture.

Temporal correlation data 124 may include any suitable data, values, indicators, or the like indicative or representative of a temporal correlation for pictures of video 121. In an embodiment, temporal correlation data 124 may include statistics obtained by motion estimation on down-sampled video 121. In such examples, quantization parameter adjustment module 106 may generate adjustment factor 126 based on such statistics.

In an embodiment, temporal correlation data 124 may include the number of blocks having a small motion vector (e.g., small motion vector blocks) and the number of total blocks of pictures of video 121. In an embodiment, temporal correlation data 124 may include the ratio of the number of blocks having a small motion vector and the number of total blocks of pictures of video 121. If the ratio is provided, quantization parameter adjustment module 106 may generate adjustment factor 126 based on the ratio. If the ratio is not provided, quantization parameter adjustment module 106 may optionally generate the ratio and quantization parameter adjustment module 106 may generate adjustment factor 126 based on the ratio and/or the received number of blocks having a small motion vector and the number of total blocks.

For example, a small motion vector block may be block having a small motion such that the sum of the absolute value of the horizontal component of the motion vector and the absolute value of the vertical component of the motion vector is less than (or does not exceed) a preselected threshold. For example, a small motion vector block may have a motion vector that satisfies Equation (1):

$$|MV\_horizontal|+|MV\_vertical|<Threshold \qquad (1)$$

where MV_horizontal may be the horizontal component of the motion vector for the block, MV_vertical may be the vertical component of the motion vector for the block, and Threshold may be the preselected threshold. A larger ratio of such small motion vector blocks to the total number of blocks may indicate higher temporal correlation (e.g., low motion) and a larger adjustment factor 126 may be generated by quantization parameter adjustment module 106. Although discussed with respect to a sum of absolute values of motion vector components, small motion vector blocks may be determined using any suitable technique or techniques.

In some embodiments, temporal correlation data 124 may include a prediction distortion for pictures of video 121. For example, the prediction distortion may be a measure of the difference between the predicted picture and the actual picture (e.g., a sum of absolute differences, a sum of squares of differences, or the like between pixel values of the predicted picture and the actual, input picture). A smaller prediction distortion may be indicative of higher temporal correlation (e.g., low motion) and a larger adjustment factor 126 may be generated by quantization parameter adjustment module 106.

As discussed, temporal correlation data 124 may be received by quantization parameter adjustment module 106 and quantization parameter adjustment module 106 may generate an adjustment factor (ΔQP) 126 for a long term reference picture based on temporal correlation data 124. For example, adjustment factor 126 may provide a quantization parameter adjustment based on a temporal correlation of video 121 such that adjustment factor 126 is larger for higher temporal correlation and smaller for lower temporal correlation. For example, if there is high temporal correlation in video 121, providing a lower coding quantization parameter (and therefore higher coding quality) may be advantageous as in high temporal correlation environments (e.g., those with little motion), the human eye may easily perceive low video quality. If there is low temporal correlation in video 121, (e.g., large motion), the human eye may not as easily perceive low video quality such that a higher QP may be permissible.

As shown, via encode module 107, adjustment factor 126 (e.g., the delta QP) may be deducted from quantization parameter 122 and encode module 107 may code long term reference pictures using the adjusted QPs (e.g., the coding quantization parameter). For example, the coding quantization parameter may be the difference between the rate control based quantization parameter and the adjustment factor. Furthermore, in some embodiments, for a first intra frame or scene change frame in a sequence of video 121, adjustment factor 126 (e.g., the delta QP) may be a predetermined value such that a known quality of picture coding is provided. For subsequent long term reference pictures, as discussed, adjustment factor 126 (e.g., the delta QP) may be determined based on estimated temporal correlation such that the higher the temporal correlation, the larger the delta QP.

In some embodiments, quantization parameter adjustment module 106 may generate adjustment factor 126 (e.g., the delta QP) for a long term reference picture based on look ahead analysis (e.g., a set of future pictures may be buffered and temporal correlation analysis may be conducted on such pictures before encoding a current picture). Such look ahead analysis may provide for determining adjustment factor 126 based on the temporal correlation of future frames. In other embodiments, adjustment module 106 may generate adjustment factor 126 based on only past frames. For example, adjustment factor 126 may be generated based on a weighted average of the temporal correlation of frames between a last long term reference picture and the current long term reference picture. In an embodiment, a weighted average of the discussed ratio between the number of blocks with a small motion vector and the total number of blocks and a weighted average of the discussed temporal distortion may be used to access a look up table containing a set of adjustment factors. For example, the weighted averages of the ratios and the temporal distortions may be used to access the look up table to provide adjustment factor 126 for a current long term reference picture.

As described, encode module 107 may code long term reference pictures using the adjusted QPs (e.g., the coding quantization parameter) such that the coding quantization parameter may be the difference between the rate control based quantization parameter (e.g., quantization parameter 122) and the delta QP (e.g., adjustment factor 126). Encode module 107 may code the long term reference picture using the coding quantization parameter using any suitable technique or techniques.

As shown, encoded pictures 125 (e.g., encoded non-long term reference pictures) and encoded pictures 127 (e.g., encoded long term reference pictures) may be provided to reference list management module 108. Encoded pictures 125 and encoded pictures 127 may also be passed along via encoded pictures and reference picture list syntax (EPs/RPLS) 128 to entropy encoder for entropy coding and insertion into bitstream 129.

Reference list management module 108 may generate a reference picture list syntax including indicators that manage the insertion of coded pictures (e.g., reference pictures for coding other pictures) into short term and/or long term reference picture lists. For example, the reference picture list syntax may provide a reference list management scheme for the applicable video codec and may be encoded and transmitted such that a decoder may retain and manage reference pictures such that they are available as reference pictures for decoding subsequent (e.g., in the coding order) pictures.

For example, a codec may provide one or two short term reference picture lists and a long term reference picture list. When only backward (e.g., temporally backward) looking prediction is provided or available, a single backward looking short term reference picture list may be used along with a long term reference picture list. When backward and forward looking prediction are provided or available, two short term reference picture lists may be provided: a backward looking short term reference picture list and a forward looking short term reference picture list. As will be appreciated, only the pictures inserted in any of the reference picture lists may be available for coding a current picture.

In an embodiment, the reference picture list syntax may include an indicator to insert a coded long term reference picture into a short term reference list immediately upon the coding completion of the long term reference picture. Please note that although the coded long term reference picture is a long term reference picture it is not immediately inserted in the long term reference picture list such that a previous long term reference picture may be retained. Furthermore, the reference picture list syntax may include an indicator to insert the long term reference picture into the long term reference picture list only after it has been removed from the short term reference picture lists. In embodiments where a single short term reference list is used, the long term reference picture is inserted into the long term reference picture list only after it has been removed from the single short term reference picture list. In embodiments where backward and forward short term reference lists are used, the long term reference picture may be inserted into the long term reference picture list after it has been removed from one of the short term reference picture lists or only after it has been removed from both short term reference picture lists. Such techniques are discussed in more detail herein.

With continued reference to FIG. 1, encoded pictures and reference picture list syntax 128 may be received by entropy encoder 109 and entropy encoder 109 may code encoded pictures and reference picture list syntax 128 into bitstream 129. Entropy encoder 109 may code encoded pictures and reference picture list syntax 128 into bitstream 129 using any suitable technique or techniques such as content adaptive encoding techniques or the like. Bitstream 129 may be any suitable bitstream such as a standards compliant bitstream. For example, bitstream 129 may be an advanced video coding (AVC) compliant bitstream, a high efficiency video coding (HEVC) compliant bitstream, a VP8 compliant bitstream, a VP9 compliant bitstream, or the like.

Figure 2:
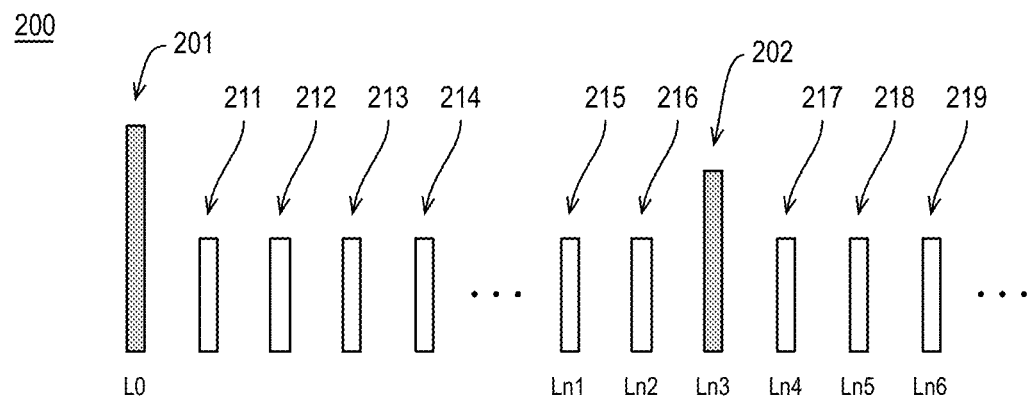
FIG. 2 illustrates an example sequence of pictures.

FIG. 2 illustrates an example sequence of pictures 200, arranged in accordance with at least some implementations of the present disclosure. With reference to FIG. 1, video 121 may include sequence of pictures 200. In an embodiment, sequence of pictures 200 may be a low delay (LD) coding sequence of pictures. As shown in FIG. 2, sequence of pictures 200 may include pictures 201, 202, and 211-219 such that pictures 201, 202 are long term reference pictures (illustrated with gray fill) and pictures 211-219 are non-long term reference pictures. The relative heights of pictures 201, 202, and 211-219 may indicate approximate number of bits used for coding the pictures. Furthermore, sequence of pictures 200 may have a display order of picture 201, pictures 211-214, any intervening pictures, pictures 215, 216, picture 202, pictures 217, 218, and so on. The reference picture list syntax discussed above may be illustrated with respect to sequence of pictures 200 and Table 1, which provides example short term and long term reference lists for sequence of pictures 200.

TABLE 1

Example Reference Picture Lists Scheme

| Encoding Order | Short Term (L0) Reference Picture List | Long Term (LT) Reference Picture List | Comments |
| --- | --- | --- | --- |
| Ln3 | Ln2, Ln1 | L0 | — |
| Ln4 | Ln3, Ln2 | L0 | — |
| Ln5 | Ln4, Ln3 | L0 | — |
| Ln6 | Ln5, Ln4 | Ln3 | Insert Ln3 into LT after it is moved out of L0 |

As shown in Table 1, an Encoding Order may be provided for sequence of pictures 200 such that the encoding order is: picture 202 (e.g., long term reference picture Ln3), picture 217 (e.g., Ln4), picture 218 (e.g., Ln5), picture 219 (e.g., Ln6). Beginning at the completion of the coding of picture 216 (e.g., Ln2), the next picture to be coded is picture 202 (e.g., long term reference picture Ln3). Furthermore, as shown in Table 1, a Short Term (L0) Reference Picture List may include (previously coded) pictures 215, 216 (e.g., Ln2, Ln1) and a Long Term (LT) Reference Picture List may include (previously coded) picture 201 (e.g., long term reference picture L0). Picture 202 (e.g., long term reference picture Ln3) may then be coded as discussed herein via encode module 107 using an adjusted coding quantization parameter.

After coding picture 202 (e.g., long term reference picture Ln3), the next picture to be coded is picture 217 (e.g., Ln4) and the reference picture list syntax as generated via reference list management module 108 may provide for inserting picture 202 (e.g., long term reference picture Ln3) into the Short Term (L0) Reference Picture List as shown in Table 1. For example, the reference picture list syntax may include an indicator or signal or the like to insert picture 202 (e.g., long term reference picture Ln3) immediately after or responsive to the coding of picture 202 (e.g., long term reference picture Ln3). It is noted that picture 202 (e.g., long term reference picture Ln3) is not immediately inserted into the Long Term (LT) Reference Picture List and that previous long term reference picture L0 is retained in the Long Term (LT) Reference Picture List. In such contexts, picture 202 (e.g., long term reference picture Ln3) may be characterized as a future long term reference picture as it is currently on the Short Term (L0) Reference Picture List, but will, as discussed below, be moved to the Long Term (LT) Reference Picture List based on the reference picture list syntax.

Picture 217 (e.g., Ln4) may then be coded as discussed herein via encode module 104 using a rate control based quantization parameter (e.g., quantization parameter 122). After coding picture 217 (e.g., Ln4), the next picture to be coded is picture 218 (e.g., Ln5) and the reference picture list syntax as generated via reference list management module 108 may provide for inserting picture 217 (e.g., Ln4) into the Short Term (L0) Reference Picture List as shown in Table 1 via an indicator or signal or the like. It is noted that in the context of inserting picture 217 (e.g., Ln4) into the Short Term (L0) Reference Picture List, picture 202 (e.g., long term reference picture Ln3) has not been removed or displaced from the Short Term (L0) Reference Picture List.

Picture 218 (e.g., Ln5) may then be coded as discussed herein via encode module 104 using a rate control based quantization parameter (e.g., quantization parameter 122). After coding picture 218 (e.g., Ln5), the next picture to be coded is picture 219 (e.g., Ln6) and the reference picture list syntax as generated via reference list management module 108 may provide for inserting picture 218 (e.g., Ln5) into the Short Term (L0) Reference Picture List as shown in Table 1 via an indicator or signal or the like. As shown, the insertion of picture 218 (e.g., Ln5) may displace or remove picture 202 (e.g., long term reference picture Ln3) from the Short Term (L0) Reference Picture List. The reference picture list syntax as generated by reference list management module 108 may provide for inserting picture 218 (e.g., Ln5) into the Short Term (L0) Reference Picture List and for inserting picture 202 (e.g., long term reference picture Ln3) into the Long Term (LT) Reference Picture List when picture 202 (e.g., long term reference picture Ln3) is replaced in the Short Term (L0) Reference Picture List.

For example, such techniques may provide a reference picture list syntax that includes indicators to enter each long term reference picture of sequence of pictures 200 into a short term reference picture list before it is inserted into a long term reference picture list. In an embodiment, each long term reference picture is inserted into the short term reference picture list immediately after it is coded. Furthermore, the described techniques may provide a reference picture list syntax that includes indicators to insert each long term reference picture of sequence of pictures 200 into a long term reference list after it exits or is removed from the short term reference picture list. In some examples, short or long term reference picture lists may be characterized as reference lists or reference frame lists or the like. Furthermore, in the example of FIG. 2 and Table 1, the short term reference picture list is limited to two entries and the long term reference picture list is limited to one entry. However, the short and long term reference picture lists may provide for any number of entries. For example, some codecs provide for the use of up to 16 reference pictures (the total number of reference pictures inserted into the short and long term reference picture lists may be up to 16 or the like). Furthermore, as used herein the term insertion into a reference picture list is meant to indicate a signal, indicator, pointer or the like representative of the reference picture is maintained in a data structure. For example, the actual reference pictures may be maintained in a memory such as coded picture buffer or the like.

The example of FIG. 2 and Table 1 illustrates an implementation with a single short term reference picture list. In such examples, long term reference pictures may be inserted into a long term reference picture list when the exit or are replaced in a short term reference picture list as described. For example, the short term reference picture list may be a backward looking reference picture list as the pictures are all before a current picture to be coded both temporally and in a coding order. In other examples, multiple short term reference picture lists may be implemented. For example, a forward looking short term reference picture list and a backward looking short term reference picture list may be maintained along with the long term reference picture list. For example, the backward looking short term reference picture list may include a list of pictures before the current picture temporally and the forward looking short term reference picture list may include a list of pictures after the current picture temporally. Of course, all reference pictures must be before the current picture to be coded in the coding order.

Figure 3:
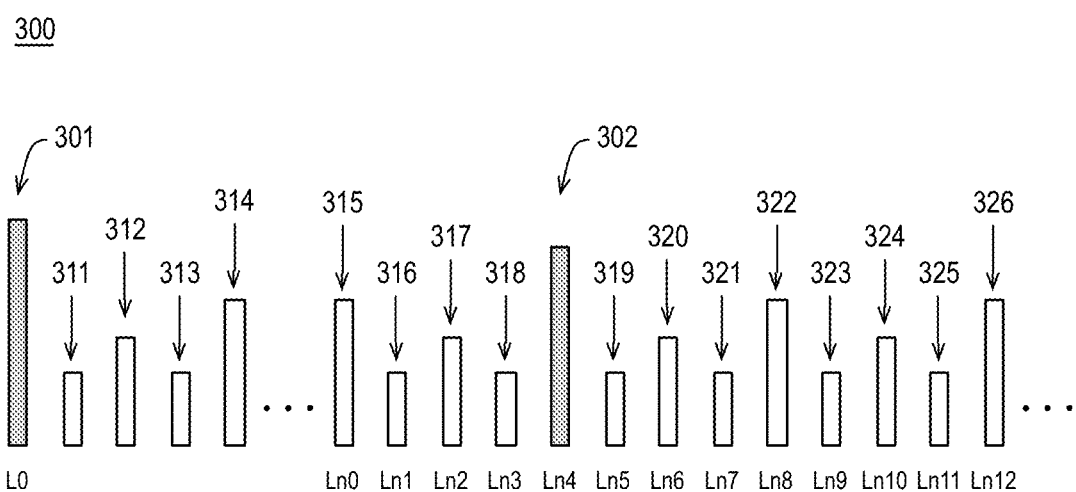
FIG. 3 illustrates an example sequence of pictures.

FIG. 3 illustrates an example sequence of pictures 300, arranged in accordance with at least some implementations of the present disclosure. With reference to FIG. 1, video 121 may include sequence of pictures 300. In an embodiment, sequence of pictures 300 may be a hierarchical B (HB) coding sequence of pictures. As shown in FIG. 3, sequence of pictures 300 may include pictures 301, 302, and 311-326 such that pictures 301, 302 are long term reference pictures (illustrated with gray fill) and pictures 311-326 are non-long term reference pictures. The relative heights of pictures 301, 302, and 311-326 may indicate approximate number of bits used for coding the pictures and sequence of pictures 300 may have a display order of picture 301, pictures 311-314, any intervening pictures, pictures 315-319, picture 302, pictures 319-326, and so on. The reference picture list syntax discussed with respect to FIG. 3 and elsewhere herein may be illustrated with respect to sequence of pictures 300 and Table 3, which provides example short term and long term reference lists for sequence of pictures 300.

TABLE 2

Example Reference Picture Lists Scheme

| Encoding Order | Short Term Backward Looking (L0) Reference Picture List | Short Term Forward Looking (L1) Reference Picture List | Long Term (LT) Reference Picture List | Comments |
|---|---|---|---|---|
| Ln2 | Ln0, Ln0-2 | Ln4 | L0 | — |
| Ln1 | Ln0, Ln0-2 | Ln2, Ln4 | L0 | — |
| Ln3 | Ln2, Ln0 | Ln4 | L0 | — |
| Ln8 | Ln4, Ln2 | | L0 | — |
| Ln6 | Ln4, Ln2 | Ln8 | L0 | — |
| Ln5 | Ln4, Ln2 | Ln6, Ln8 | L0 | — |
| Ln7 | Ln6, Ln4 | Ln8 | L0 | — |
| Ln12 | Ln8, Ln6 | | Ln4 | Insert Ln4 into LT after it is moved out of L0 and L1 |

As shown in Table 2, an Encoding Order may be provided for sequence of pictures 300 such that the encoding order is: picture 317 (e.g., Ln2), picture 316 (e.g., Ln1), picture 318 (e.g., Ln3), picture 322 (e.g., Ln8), picture 320 (e.g., Ln6), picture 319 (e.g., Ln5), picture 321 (e.g., Ln7), picture 326 (e.g., Ln12). Beginning at the completion of the coding of picture 302 (e.g., long term reference picture 302), the next picture to be coded is 317 (e.g., Ln2). For example, picture 302 (e.g., long term reference picture 302) may have been coded as discussed herein via encode module 107 using an adjusted coding quantization parameter. Furthermore, as shown in Table 2, a Short Term Backward Looking (L0) Reference Picture List may include (previously coded) picture 315 (e.g., Ln0) and a (previously coded) picture (not shown) Ln0-2 (e.g., a picture two pictures prior to Ln0; Ln0-2 may be read as Ln zero minus two), Short Term Forward Looking (L1) Reference Picture List may include (immediately previously coded) picture 302 (e.g., long term reference picture 302), and a Long Term (LT) Reference Picture List may include (previously coded) picture 301 (e.g., long term reference picture L0).

For example, the reference picture list syntax may include an indicator or signal or the like to insert picture 302 (e.g., long term reference picture Ln4) into Short Term Backward Looking (L0) Reference Picture List immediately after or responsive to the coding of picture 302 (e.g., long term reference picture Ln4). It is noted that picture 302 (e.g., long term reference picture Ln4) is not immediately inserted into the Long Term (LT) Reference Picture List and that previous long term reference picture L0 is retained in the Long Term (LT) Reference Picture List. In such contexts, picture 302 (e.g., long term reference picture Ln4) may be characterized as a future long term reference picture as it is currently on the Short Term Reference Picture List (e.g., L0 or L1), but will, as discussed below, be moved to the Long Term (LT) Reference Picture List based on the reference picture list syntax.

Picture 317 (e.g., Ln2) may then be coded as discussed herein via encode module 104 using a rate control based quantization parameter (e.g., quantization parameter 122). After coding picture 317 (e.g., Ln2), the next picture to be coded is picture 316 (e.g., Ln1) and the reference picture list syntax as generated via reference list management module 108 may provide for inserting picture 317 (e.g., Ln2) into the Short Term Forward Looking (L1) Reference Picture List. As shown, reference picture lists L0 and LT remain unchanged.

Picture 316 (e.g., Ln1) may then be coded as discussed herein via encode module 104 using quantization parameter 122. After coding picture 316 (e.g., Ln1), the next picture to be coded is picture 318 (e.g., Ln3) and the reference picture list syntax as generated via reference list management module 108 may provide for inserting picture 317 (e.g., Ln2) into the Short Term Backward Looking (L0) Reference Picture List and for removing from the Short Term Forward Looking (L1) Reference Picture List. As shown, reference picture lists LT remains unchanged.

Picture 318 (e.g., Ln3) may then be coded as discussed herein via encode module 104 using quantization parameter 122. After coding picture 318 (e.g., Ln3), the next picture to be coded is picture 322 (e.g., Ln8) and the reference picture list syntax as generated via reference list management module 108 may provide for inserting picture 320 (e.g., long term reference picture Ln4) into the Short Term Backward Looking (L0) Reference Picture List (replacing picture 315 (e.g., Ln0) and leaving picture list L1 empty). As shown, reference picture list LT remains unchanged.

Picture 322 (e.g., Ln8) may then be coded as discussed herein via encode module 104 using quantization parameter 122. After coding picture 322 (e.g., Ln8), the next picture to be coded is picture 320 (e.g., Ln6) and the reference picture list syntax as generated via reference list management module 108 may provide for inserting picture 322 (e.g., Ln8) into the Short Term Forward Looking (L1) Reference Picture List. As shown, reference picture lists L0 and LT remain unchanged.

Picture 320 (e.g., Ln6) may then be coded as discussed herein via encode module 104 using quantization parameter 122. After coding picture 320 (e.g., Ln6), the next picture to be coded is picture 319 (e.g., Ln5) and the reference picture list syntax as generated via reference list management module 108 may provide for inserting picture 320 (e.g., Ln6) into the Short Term Forward Looking (L1) Reference Picture List. As shown, reference picture lists L0 and LT remain unchanged.

Picture 319 (e.g., Ln5) may then be coded as discussed herein via encode module 104 using quantization parameter 122. After coding picture 319 (e.g., Ln5), the next picture to be coded is picture 321 (e.g., Ln7) and the reference picture list syntax as generated via reference list management module 108 may provide for inserting picture 320 (e.g., Ln6) into the Short Term Backward Looking (L0) Reference Picture List (replacing 317 (e.g., Ln2)) and removing picture 320 (e.g., Ln6) from the Short Term Forward Looking (L1) Reference Picture List. As shown, reference picture list LT remains unchanged.

Picture 321 (e.g., Ln7) may then be coded as discussed herein via encode module 104 using quantization parameter 122. After coding picture 321 (e.g., Ln7), the next picture to be coded is picture 326 (e.g., Ln12) and the reference picture list syntax as generated via reference list management module 108 may provide for inserting picture 322 (e.g., Ln8) into the Short Term Backward Looking (L0) Reference Picture List (replacing 318 (e.g., Ln4) and leaving reference picture list L1 empty). As shown, the insertion of picture 322 (e.g., Ln8) may displace or remove picture 302 (e.g., long term reference picture Ln4) from the Short Term Backward Looking (L0) Reference Picture List. The reference picture list syntax as generated by reference list management module 108 may provide for inserting picture 302 (e.g., long term reference picture Ln4) into the Long Term (LT) Reference Picture List when picture 302 (e.g., long term reference picture Ln4) has exited from or been replaced in both the Short Term Reference Picture Lists, L0 and L1.

As shown, picture 302 (e.g., long term reference picture Ln4) may exit from the Short Term Forward Looking (L1) Reference Picture List at the encoding of picture 322 (e.g., Ln8) and from the Short Term Backward Looking (L0) Reference Picture List at the encoding of picture 326 (e.g., Ln12). As discussed, the reference picture list syntax as generated via reference list management module 108 may provide for inserting picture 302 (e.g., long term reference picture Ln4) into the Long Term (LT) Reference Picture List only when picture 302 (e.g., long term reference picture Ln4) has exited the Short Term Forward Looking (L1) Reference Picture List and the Short Term Backward Looking (L0) Reference Picture List.

For example, such techniques may provide a reference picture list syntax that includes indicators to enter each long term reference picture of sequence of pictures 300 into a short term reference picture list (either forward or backward looking) before it is inserted into a long term reference picture list. In an embodiment, each long term reference picture is inserted into a short term reference picture list immediately after it is coded. Furthermore, the described techniques may provide a reference picture list syntax that includes indicators to insert each long term reference picture of sequence of pictures 300 into a long term reference list after it exits or is removed from any and all short term reference picture lists. In other embodiments, reference picture list syntax may include indicators to insert long term reference pictures of sequence of pictures 300 into a long term reference list after it exits or is removed from one of multiple short term reference picture lists. For example, in the context of Table 2, picture 302 (e.g., long term reference picture Ln4) may be inserted into the Long Term (LT) Reference Picture List after it is removed from the Short Term Forward Looking (L1) Reference Picture List at the coding of picture 322 (e.g., Ln8). In the example of FIG. 3 and Table 2, both short term reference picture lists are limited to two entries and the long term reference picture list is limited to one entry. However, the short and long term reference picture lists may provide for any number of entries such as up to 16 reference pictures or the like.

Figure 4:
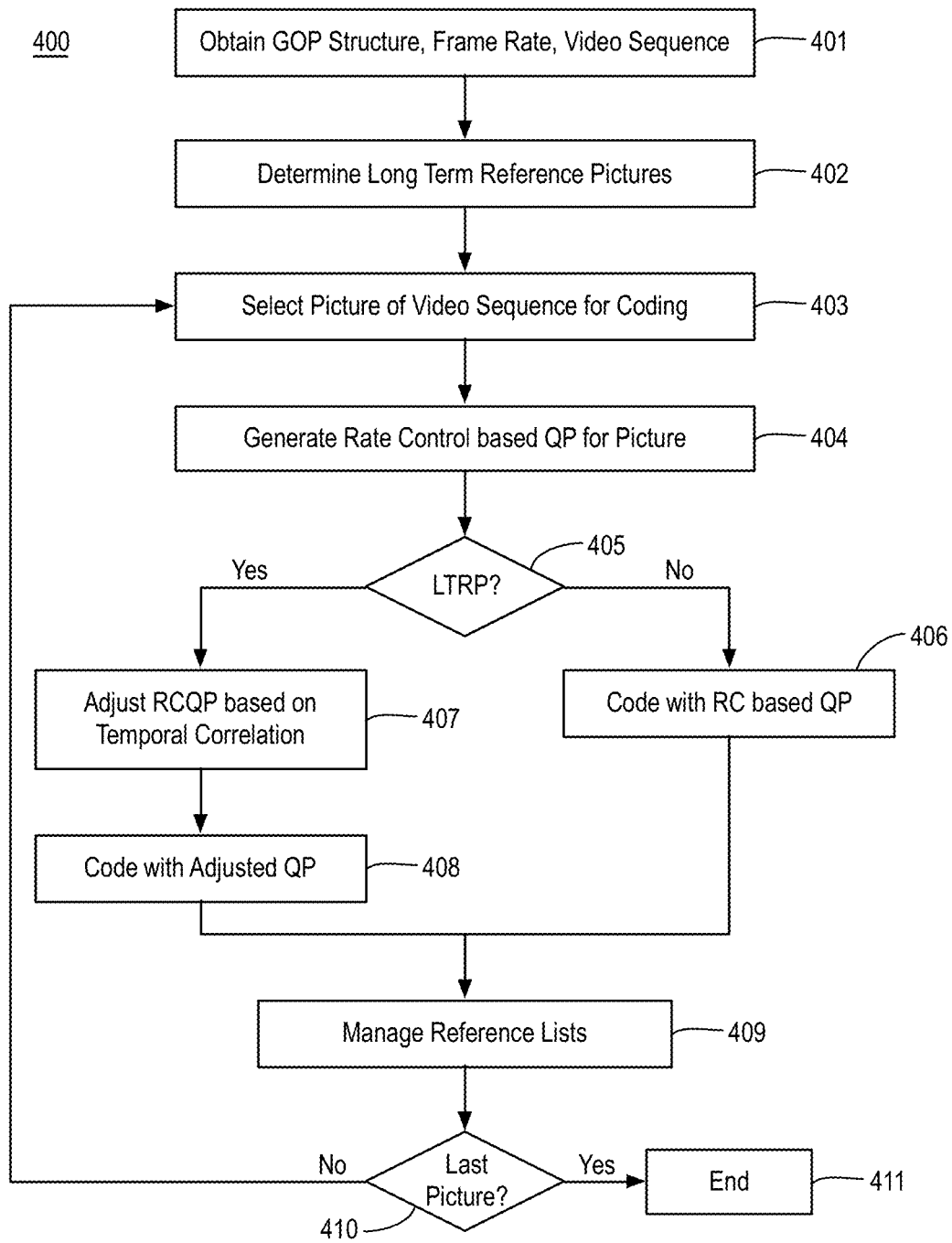
FIG. 4 is a flow diagram illustrating an example process for video coding including coding long term reference pictures.

FIG. 4 is a flow diagram illustrating an example process 400 for video coding including coding long term reference pictures, arranged in accordance with at least some implementations of the present disclosure. Process 400 may include one or more operations 401-411 as illustrated in FIG. 4. Process 400 may be performed by a device (e.g., system 100 as discussed herein) to code a video sequence including coding long term reference pictures. Process 400 may be performed at a video sequence level or a group of pictures level and process 400 may be repeated for any number of video sequences or groups of pictures.

Process 400 may begin at operation 401, where a group of picture structure, a frame rate, and a video sequence may be obtained. The group of picture structure, frame rate, and video sequence may be obtained using any suitable technique or techniques. In an embodiment, the picture structure, frame rate, and video sequence may be received by a system such as system 100. For example, an application or user may evoked system 100 to provide video coding and the evocation may include the picture structure, frame rate, and video sequence.

Processing may continue at operation 402, where long term reference pictures may be determined for the video sequence obtained at operation 401. The long term reference pictures may be determined or assigned using any suitable technique or techniques. In an embodiment, long term reference picture decision module 102 may determine or assign the long term reference pictures for the video sequence. In an embodiment, all intra-pictures of the video sequence may be assigned as long term reference pictures. In an embodiment, all detected scene change pictures of the video sequence may be assigned as long term reference pictures. In an embodiment, long term reference pictures may be assigned to the video sequence at a predetermined interval or an interval determined based on multiplying a group of picture size of the video sequence and a predetermined multiplier.

Processing may continue at operation 403, where a picture of the video sequence may be selected for coding. The picture may be selected as a first in a coding order for the video sequence at a first iteration of operation 403 and, at subsequent iterations of operation 403, subsequent pictures in the coding order may be selected.

Processing may continue at operation 404, where a rate control based quantization parameter (QP) may be generated for the picture selected at operation 404. The rate control based quantization parameter may be generated using any suitable technique or techniques such as standard rate control operations including rate distortion optimization or the like.

Processing may continue at decision operation 405, where a determination may be made as to whether the picture selected at operation 403 is a long term reference picture (LTRP). If not, processing may continue at operation 406, where the selected picture may be coded using the rate control (RC) based quantization parameter generated at operation 404. For example, encode module 104 may code the non-long term reference picture.

If the picture selected at operation 403 is a long term reference picture, processing may continue at operation 407, where the rate control based quantization parameter (RCQP) may be adjusted by an adjustment factor (delta QP) based on a temporal correlation of the video sequence at or near the selected long term reference picture. As discussed, in some embodiments, a first long term reference picture in a video sequence may have a predetermined adjustment factor such that temporal correlation based adjustment may not be provided. Such techniques may provide ease of implementation and a known quality enhancement for the first long term reference picture. Such a predetermined adjustment factor may be applied at a first iteration of operation 407 for example.

At subsequent iterations of operation 407, as discussed, the rate control based quantization parameter may be adjusted by an adjustment factor (delta QP) based on a temporal correlation of the video sequence at or near the selected long term reference picture. The temporal correlation may be determined using any suitable technique or techniques. For example, statistics obtained by motion estimation on down-sampled video of the video sequence may be used to determine the adjustment factor. In an embodiment, the adjustment factor may be determined based on a ratio of the number of blocks having a small motion vector and the number of total blocks of pictures of the video sequence. In an embodiment, the adjustment factor may be determined based on a prediction distortion. In an embodiment, both the ratio and the prediction distortion may be used. Furthermore, such ratios and/or prediction distortion for any number of pictures temporally neighboring and including the selected long term reference picture may be used. If forward looking prediction is used, the temporal correlation of forward pictures (e.g., in the picture presentation order) may be used. If only backward looking prediction is used only temporal correlation of backward looking pictures (e.g., in the picture presentation order) may be used. In an embodiment, the ratios and prediction distortions of such available pictures may be weighted and summed an the resultant weighted ratio and prediction distortion may be used to access a look up table of a set of adjustment factor (delta QPs) to determine the adjustment factor (delta QP) for the selected long term reference picture.

Processing may continue at operation 408, where the selected long term reference picture may be coded using the adjusted quantization parameter (e.g., coding quantization parameter) generated at operation 407. For example, encode module 107 may code the long term reference picture based on the adjusted quantization parameter (e.g., coding quantization parameter).

Processing may continue from operation 406 or 408 at operation 409, where short term and long term reference picture lists may be managed as discussed herein. For example, at operation 409, a reference picture list syntax may be generated including an indicator or signal or the like to insert reference a picture or pictures into the lists, move a picture or pictures between lists, remove a picture or pictures from the list, or the like. For example, the picture coded at operation 406 or 408 may be inserted into a short term reference picture list based on its need as a reference for the coding of subsequent pictures. Furthermore, in response to the picture coded at operation 406 or 408 being inserted into a short term reference picture list, a previous long term reference picture may be moved from a short term reference picture list or lists to a long term reference picture list. Furthermore, if the selected picture was a long term reference picture and coded at operation 408, a flag or indicator may be generated such that upon replacement or exiting from the short term reference picture list or lists, the long term reference picture is to be inserted into the long term reference picture list. Such techniques have been discussed with respect to FIGS. 2 and 3 and Tables 1 and 2 and are discussed in further detail with respect to FIG. 5.

Processing may continue at decision operation 410, where a determination may be made as to whether the picture selected at operation 403 is the last picture to be coded. If so, processing may end at operation 411. If not, processing may continue at operation 403 where a subsequent picture in the video sequence may be selected for coding and further processing as discussed herein. Furthermore, although not shown in FIG. 4, the pictures coded at operations 406, 408 and the reference picture list syntax generated at operation 409 may be coded into a bitstream via entropy encoding techniques or the like. Such coding may be performed after all pictures of a sequence are processed, after a particular number of pictures are processed, in a real-time manner, or the like.

Figure 5:
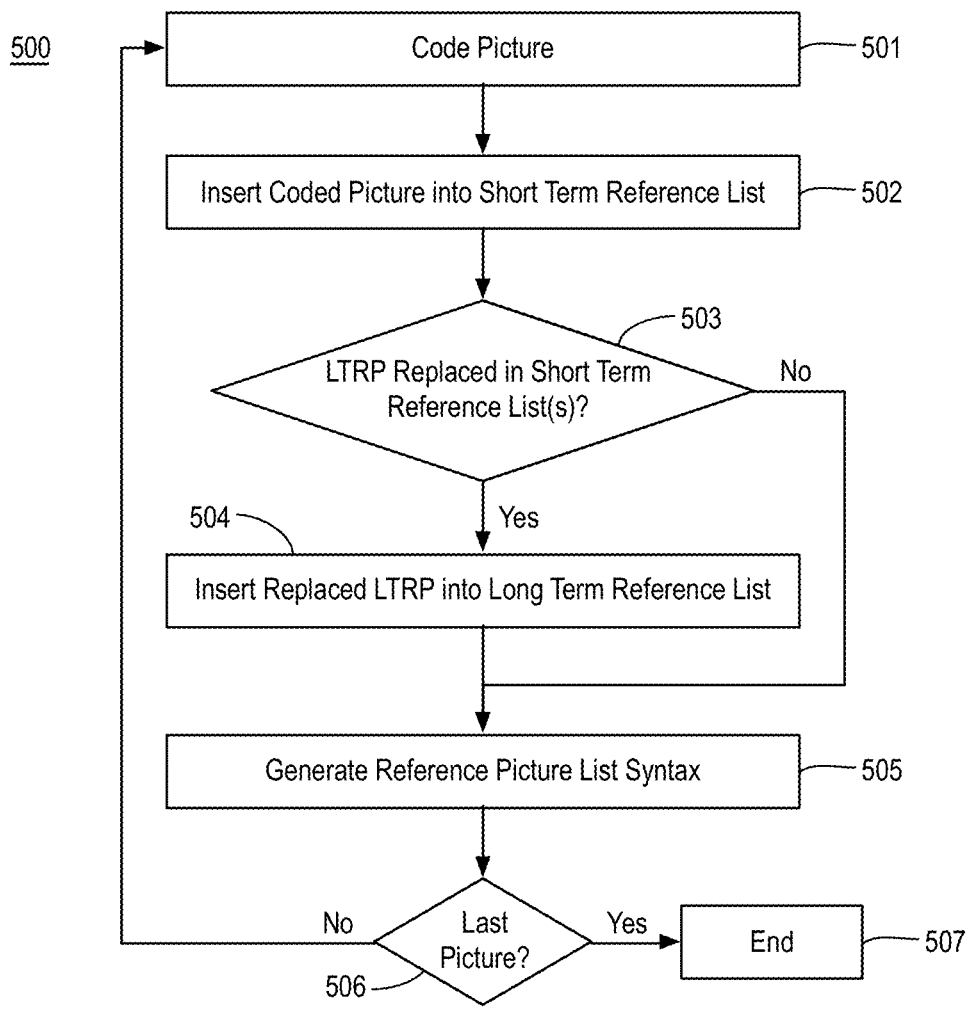
FIG. 5 is a flow diagram illustrating an example process for managing reference picture lists.

FIG. 5 is a flow diagram illustrating an example process 500 for managing reference picture lists, arranged in accordance with at least some implementations of the present disclosure. Process 500 may include one or more operations 501-507 as illustrated in FIG. 5. Process 500 may be performed by a device (e.g., system 100 as discussed herein) to manage reference picture lists and to generate a reference picture list syntax. Process 500 may be performed at a picture level, video sequence level, or a group of pictures level and process 500 may be repeated for any number of pictures, video sequences, or groups of pictures.

Process 500 may begin at operation 501, where a picture may be coded as discussed herein such that a long term reference picture is coded with an adjusted coding quantization parameter and a non-long term reference picture is coded with a rate control based quantization parameter.

Processing may continue at operation 502, where the coded picture may be inserted into a short term reference list. As described, as used herein the term insert a coded picture into a reference list refers to any modification of a data structure that indicates a coded picture is to be saved as a reference picture. The coded picture itself may be stored or saved in memory such as a picture buffer or the like. As discussed above, the insertion of a picture into a short term reference list may be based on the picture being needed as a reference picture for future (e.g., in an encode order) pictures of a sequence of pictures. For example, if the picture coded at operation 501 is to be a backward looking reference picture for a future picture, the picture coded at operation 501 may be inserted into a backward looking short term reference picture list or, if only backward looking reference pictures are used, a short term reference picture list. If the picture coded at operation 501 is to be a forward looking reference picture for a future picture, the picture coded at operation 501 may be inserted into a forward looking short term reference picture list. Operation 502 may be performed regardless of whether the picture coded at operation 501 is a long term or non-long term reference image. If the picture coded at operation 501 is a long term reference image, an additional flag or indicator or the like may be set such that the long term reference image may be characterized as a future long term reference image and the removal of the long term reference image from a short term reference picture list or lists may trigger a move of the long term reference image to a long term reference image list.

Processing may continue at decision operation 503, where a determination may be made as to whether operation 502 caused a long term reference picture (LTRP) to be replaced or removed or to exit or the like from a short term reference picture list or all short term reference picture lists or the like. As discussed, if only a single short term reference picture list is used, the removal of a long term reference picture may trigger its move to a long term reference picture list. If multiple short term reference picture lists are used, in some embodiments, the removal of a long term reference picture from all such lists may trigger its move to a long term reference list. As shown, if a long term reference picture was not removed from a short term reference picture list or all such lists, processing may continue at operation 505 as discussed below.

If a long term reference picture (e.g., a future long term reference picture) was removed from a short term reference picture list or all such lists, processing may continue at operation 504. It is noted that in the embodiment of using multiple short term reference lists, process 500 may require the future long term reference picture be removed from all such lists at operation 503 for the process to proceed at operation 504. However, in other embodiments, removal of the future long term reference picture from one of the multiple short term reference lists may cause process 500 to proceed at operation 504 from operation 503.

At operation 504, the future long term reference picture replaced at operation 502 may be moved or inserted into the long term reference picture list at operation 504. It is noted that delaying the insertion of the long term reference picture until it is removed from such short term reference lists may allow a previous long term reference picture to be retained for a longer duration as compared to the long term reference picture being inserted immediately into the long term reference picture list. Such techniques may provide for more high quality pictures to be retained for prediction and the like.

Processing may continue from operation 503 (if no long term reference picture was replaced in the short term reference list or lists) or from operation 504 at operation 505, where a reference picture list syntax may be generated. As discussed herein, the reference picture list syntax may indicate which pictures are to be inserted, moved, removed, and the like from the available short and long term reference picture lists based on the selection of long term reference pictures, coding, and picture structure of the video sequence being coded. Such a reference picture list syntax may be implemented using any suitable technique or techniques. For example, the reference picture list syntax may include the list of pictures to be included in such lists at each picture in the encode order or indicators indicating pictures are to be inserted, removed, or the like from such lists.

Processing may continue at decision operation 506, where a determination may be made as to whether the picture coded at operation 501 is the last picture to be coded. If so, processing may end at operation 507. If not, processing may continue with a subsequent picture in the video sequence being selected for coding (not shown), the selected picture being coded at operation 501, and further processing as discussed herein. Furthermore, although not shown in FIG. 5, the pictures coded at operation 501 and the reference picture list syntax generated at operation 505 may be coded into a bitstream via entropy encoding techniques or the like. Such coding may be performed after all pictures of a sequence are processed, after a particular number of pictures are processed, in a real-time manner, or the like.

Figure 6:
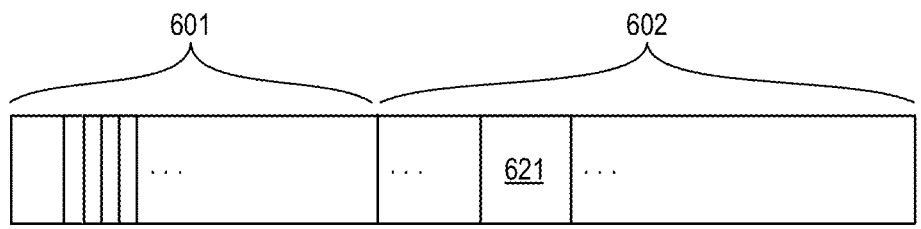
FIG. 6 illustrates an example bitstream.

FIG. 6 illustrates an example bitstream 600, arranged in accordance with at least some implementations of the present disclosure. In some examples, bitstream 600 may correspond to bitstream 129 as shown in FIG. 1. As shown in FIG. 6, in some examples, bitstream 600 may include a header portion 601 and a data portion 602. In some examples, reference picture list syntax indicators including indicators or flags or bits or the like indicating which pictures are to be maintained in short and long term reference picture lists, movement of pictures into or out of such lists, or the like may be provided via bitstream 600. For example, reference picture list syntax indicators for a particular picture or video sequence or group of pictures or the like may be provided via bitstream 600. Furthermore, data portion 602 may include encoded picture data 621 for coded pictures. For example, encoded picture data 621 may include a representation of encoded picture 125 and/or encoded picture 127 or the like. Such encoded picture data 621 may include, for example, encoded quantized transform coefficients, encoded motion vector data, encoded picture reconstruction data, or the like.

Figure 7:
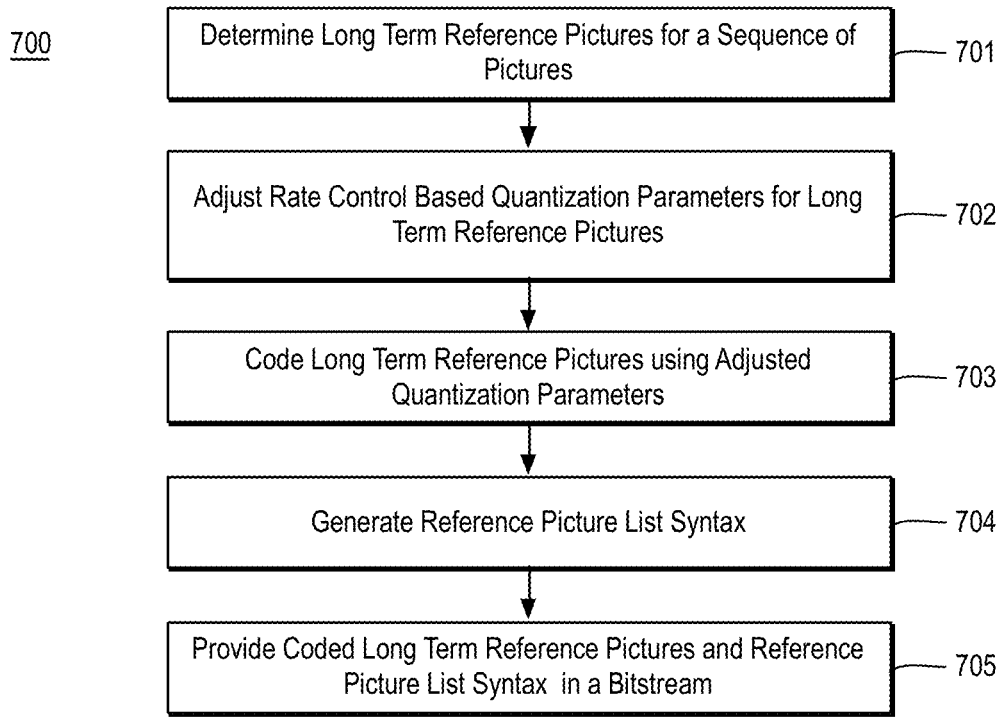
FIG. 7 is a flow diagram illustrating an example process for video coding including coding long term reference frames.

FIG. 7 is a flow diagram illustrating an example process 700 for video coding including coding long term reference frames, arranged in accordance with at least some implementations of the present disclosure. Process 700 may include one or more operations 701-705 as illustrated in FIG. 7. Process 700 may form at least part of a video coding process. By way of non-limiting example, process 700 may form at least part of a video coding process as performed by any device or system as discussed herein such as system 100. Furthermore, process 700 will be described herein with reference to system 800 of FIG. 8.

Figure 8:
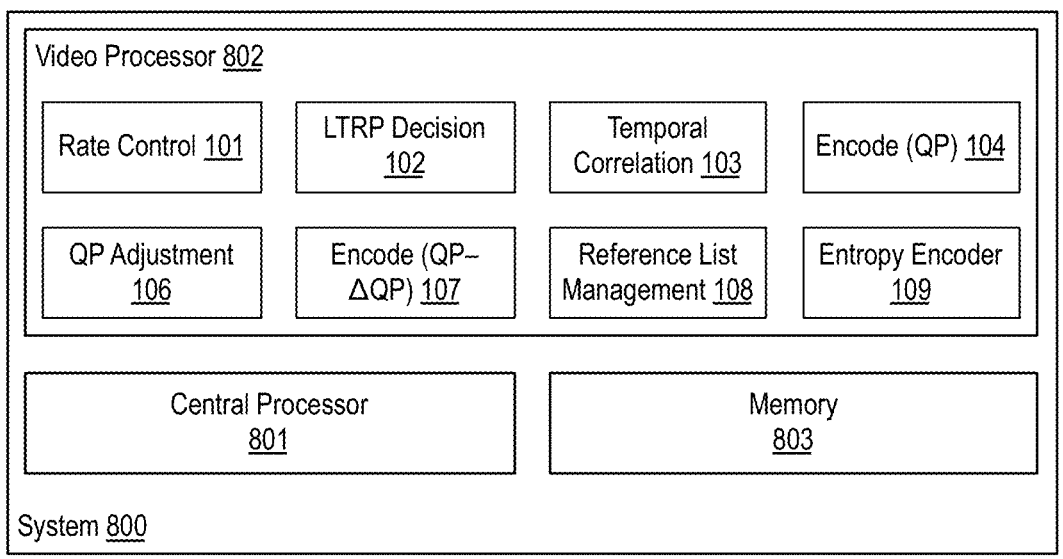
FIG. 8 is an illustrative diagram of an example system for video coding including coding long term reference frames.

FIG. 8 is an illustrative diagram of an example system 800 for video coding including coding long term reference frames, arranged in accordance with at least some implementations of the present disclosure. As shown in FIG. 8, system 800 may include central processor 801, a video processor 802, and a memory 803. Also as shown, video processor 802 may include rate control module 101, long term reference picture decision module 102, temporal correlation module 103, encode module 104, quantization parameter adjustment module 106, encode module 107, reference list management module 108, and entropy encoder 109. In the example of system 800, memory 803 may store video data or related content such as video, video data, picture data, frame data, group of picture data, picture type data, quantization parameters, temporal correlation data, quantization parameter adjustment factors, delta quantization parameters, encoded picture data, short term reference picture lists, long term reference picture lists, reference picture list syntax data, bitstream data, control data, and/or any other data as discussed herein.

As shown, in some examples, rate control module 101, long term reference picture decision module 102, temporal correlation module 103, encode module 104, quantization parameter adjustment module 106, encode module 107, reference list management module 108, and entropy encoder 109 may be implemented via video processor 802. In other examples, one or more or portions of rate control module 101, long term reference picture decision module 102, temporal correlation module 103, encode module 104, quantization parameter adjustment module 106, encode module 107, reference list management module 108, and entropy encoder 109 may be implemented via central processor 801 or another processing unit such as an image processor, a graphics processor, or the like.

Video processor 802 may include any number and type of video, image, or graphics processing units that may provide the operations as discussed herein. Such operations may be implemented via software or hardware or a combination thereof. For example, video processor 802 may include circuitry dedicated to manipulate pictures, picture data, or the like obtained from memory 803. Central processor 801 may include any number and type of processing units or modules that may provide control and other high level functions for system 800 and/or provide any operations as discussed herein. Memory 803 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 703 may be implemented by cache memory.

In an embodiment, one or more or portions of rate control module 101, long term reference picture decision module 102, temporal correlation module 103, encode module 104, quantization parameter adjustment module 106, encode module 107, reference list management module 108, and entropy encoder 109 may be implemented via an execution unit (EU). The EU may include, for example, programmable logic or circuitry such as a logic core or cores that may provide a wide array of programmable logic functions. In an embodiment, one or more or portions of rate control module 101, long term reference picture decision module 102, temporal correlation module 103, encode module 104, quantization parameter adjustment module 106, encode module 107, reference list management module 108, and entropy encoder 109 may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 7, process 700 may begin at operation 701, where one or more long term reference pictures may be determined or selected for a sequence of pictures. The one or more long term reference pictures may be determined or selected for a sequence of pictures using any suitable technique or techniques. In an embodiment, long term reference picture decision module 102 as implemented via video processor 802 may determine the one or more long term reference pictures for a sequence of pictures. In an embodiment, determining the one or more long term reference pictures may include assigning all intra-pictures of the sequence of pictures as long term reference pictures and/or assigning all detected scene change pictures of the sequence of pictures as long term reference pictures. In an embodiment, determining the one or more long term reference pictures may include assigning long term reference pictures at an interval (e.g., a time interval or a picture number interval) such that the interval is a predetermined interval or such that the interval is determined based on multiplying a group of picture size of the sequence of pictures and a predetermined multiplier.

Processing may continue at operation 702, where a rate control based quantization parameter for an individual long term reference picture of the long term reference pictures may be adjusted to generate a coding quantization parameter for the individual long term reference picture. The rate control based quantization parameter may be generated using any suitable technique or techniques. Furthermore, the rate control based quantization parameter may be adjusted using any suitable technique or techniques. In an embodiment, rate control module 101 as implemented via video processor 802 may generate the rate control based quantization parameter for the individual long term reference picture and quantization parameter adjustment module 106 as implemented via video processor 802 may adjust the rate control based quantization parameter to generate the coding quantization parameter for the individual long term reference picture. In an embodiment, adjusting the rate control based quantization parameter may include reducing the rate control based quantization parameter by an adjustment factor determined based on a temporal correlation associated with the individual long term reference picture. For example, temporal correlation module 103 as implemented via video processor 802 may provide temporal correlation data and quantization parameter adjustment module 106 as implemented via video processor 802 may generate the adjustment factor.

In an embodiment, an adjustment factor to adjust the rate control based quantization parameter to the coding quantization parameter may be determined such that the adjustment factor is based on at least one of a ratio of a number of small motion blocks to a total number of blocks for one or more pictures of the sequence of pictures or a prediction distortion cost corresponding to the one or more pictures of the sequence of pictures. In an embodiment, the adjustment factor may be based on an average or weighted average ratio and/or an average or weighted average prediction distortion cost for several frames temporally near the individual long term reference picture (temporally before and/or after) and optionally including the individual long term reference picture. In an embodiment, a second rate control based quantization parameter may be adjusted for a second long term reference picture of the long term reference pictures to generate a second coding quantization parameter for the second individual long term reference picture such that the coding quantization parameter is less than the second coding quantization parameter based on the individual long term reference picture having a higher temporal correlation than the second long term reference picture. For example, the individual long term reference picture having a higher temporal correlation than the second long term reference picture may entail the pictures temporally neighboring the individual long term reference picture having a higher temporal correlation than the pictures temporally neighboring the second individual long term reference picture.

Processing may continue at operation 703, where the individual long term reference picture may be coded based on the coding quantization parameter. The coding of the individual long term reference picture may be performed using any suitable technique or techniques. In an embodiment, encode module 107 as implemented via video processor 802 may code the individual long term reference picture using the coding quantization parameter such that the coding quantization parameter is the rate control based quantization parameter minus the adjustment factor (e.g., QP−ΔQP). Furthermore, non-long term reference pictures may be coded based on rate control based quantization parameters as discussed herein. In an embodiment, encode module 104 as implemented via video processor 802 may code the non-long term reference pictures.

Processing may continue at operation 704, where a reference picture list syntax including an indicator to insert the individual long term reference picture into a long term reference picture list when the individual long term reference picture is replaced in a short term reference picture list by another picture may be generated. The reference picture list syntax may be generated using any suitable technique or techniques. In an embodiment, the reference picture list syntax may be generated by reference list management module 108 as implemented via video processor 802. In an embodiment, the indicator is to indicate insertion of the individual long term reference picture into the long term reference picture list when the individual long term reference picture is replaced in a single short term reference picture list. In another embodiment, the indicator is to indicate insertion of the individual long term reference picture into the long term reference picture list when the individual long term reference picture is replaced in both a short term backward reference picture list and a short term forward reference picture list. In an embodiment, the reference picture list syntax also includes a second indicator to insert the individual long term reference picture into the short term reference picture list immediately responsive to the coding of the individual long term reference picture. In an embodiment, the indicator is to indicate replacement of a previous long term reference picture by the individual long term reference picture in the long term reference picture list.

Processing may continue at operation 705, where the coded individual long term reference picture and the reference picture list syntax may be provided in a bitstream. For example, the coded individual long term reference picture from operation 703 and the reference picture list syntax from operation 704 may be provided in a bitstream. The coded individual long term reference picture and the reference picture list syntax may be provided in a bitstream using any suitable technique or techniques. In an embodiment, entropy encoder 109 as implemented via video processor 802 may provide the coded individual long term reference picture and the reference picture list syntax may be provided in the bitstream. For example, entropy encoder 109 may provide context adaptive variable length coding, context adaptive binary arithmetic coding, or the like. The bitstream generated at operation 705 may be any suitable bitstream such as a standards compliant bitstream. Fore example, the bitstream may be an advanced video coding (AVC) compliant bitstream, a high efficiency video coding (HEVC) compliant bitstream, a VP8 compliant bitstream, a VP9 compliant bitstream, or the like.

Process 700 may be repeated any number of times either in series or in parallel for any number pictures or groups of pictures or video sequences or the like. As discussed, process 700 may provide for video encoding including coding long term reference pictures. For example, the discussed techniques for video coding may provide long term reference picture selection, rate control, and reference list management to achieve improved efficiency and video quality.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 9:
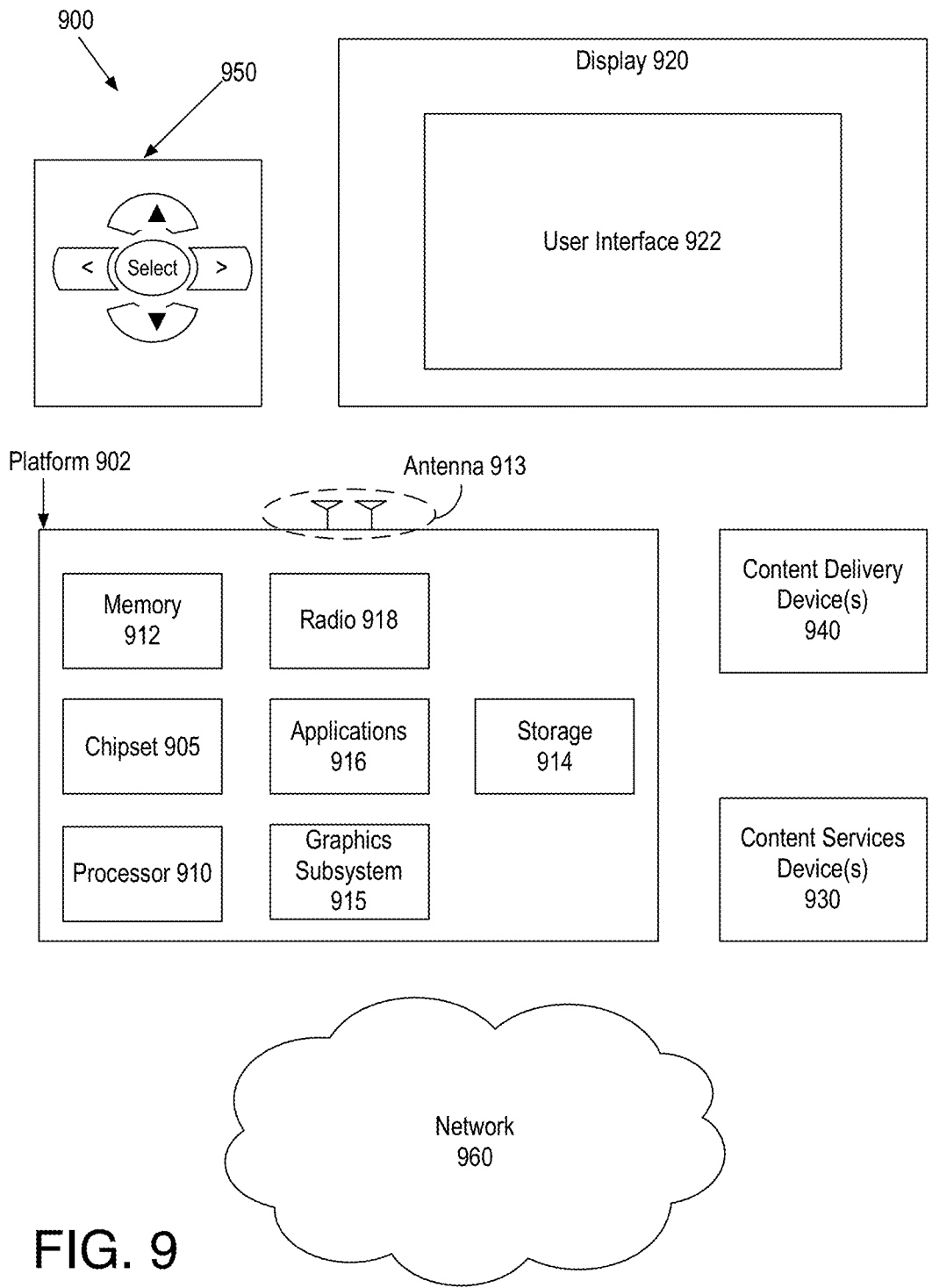
FIG. 9 is an illustrative diagram of an example system.

FIG. 9 is an illustrative diagram of an example system 900, arranged in accordance with at least some implementations of the present disclosure. In various implementations, system 900 may be a mobile system although system 900 is not limited to this context. For example, system 900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 900 includes a platform 902 coupled to a display 920. Platform 902 may receive content from a content device such as content services device(s) 930 or content delivery device(s) 940 or other similar content sources. A navigation controller 950 including one or more navigation features may be used to interact with, for example, platform 902 and/or display 920. Each of these components is described in greater detail below.

In various implementations, platform 902 may include any combination of a chipset 905, processor 910, memory 912, antenna 913, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, DisplayPort, wireless HDMI, and/or wireless HD compliant techniques. Graphics subsystem 915 may be integrated into processor 910 or chipset 905. In some implementations, graphics subsystem 915 may be a stand-alone device communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 920 may include any television type monitor or display. Display 920 may include, for example, a computer display screen, touch screen display, video monitor, television-like device, and/or a television. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In various implementations, content services device(s) 930 may include a cable television box, personal computer, network, telephone, Internet enabled devices or appliance capable of delivering digital information and/or content, and any other similar device capable of uni-directionally or bi-directionally communicating content between content providers and platform 902 and/display 920, via network 960 or directly. It will be appreciated that the content may be communicated uni-directionally and/or bi-directionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of may be used to interact with user interface 922, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI) and televisions and monitors allow the user to control and provide data to the computer or television using physical gestures.

Movements of the navigation features of may be replicated on a display (e.g., display 920) by movements of a pointer, cursor, focus ring, or other visual indicators displayed on the display. For example, under the control of software applications 916, the navigation features located on navigation may be mapped to virtual navigation features displayed on user interface 922, for example. In various embodiments, may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off." In addition, chipset 905 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit the present disclosure.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
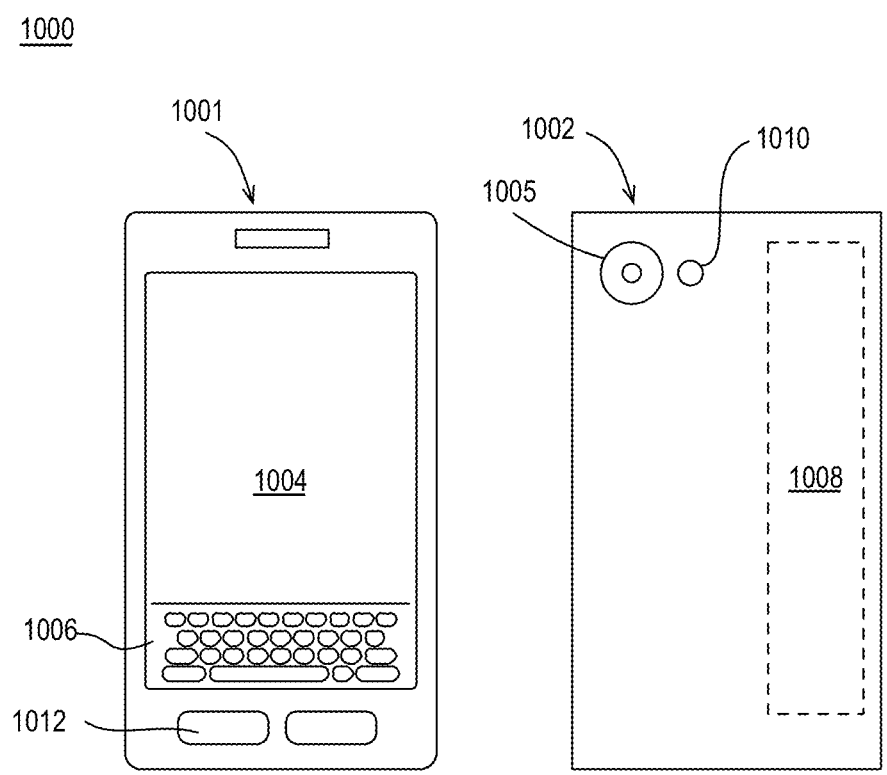
FIG. 10 illustrates an example device, all arranged in accordance with at least some implementations of the present disclosure.

As described above, system 900 may be embodied in varying physical styles or form factors. FIG. 10 illustrates an example small form factor device 1000, arranged in accordance with at least some implementations of the present disclosure. In some examples, system 900 may be implemented via device 1000. In other examples, system 100 or portions thereof may be implemented via device 1000. In various embodiments, for example, device 1000 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1000 may include a housing with a front 1001 and a back 1002. Device 1000 includes a display 1004, an input/output (I/O) device 1006, and an integrated antenna 1008. Device 1000 also may include navigation features 1012. I/O device 1006 may include any suitable I/O device for entering information into a mobile computing device. Examples for I/O device 1006 may include an alphanumeric keyboard, a numeric keypad, a touch pad, input keys, buttons, switches, microphones, speakers, voice recognition device and software, and so forth. Information also may be entered into device 1000 by way of microphone (not shown), or may be digitized by a voice recognition device. As shown, device 1000 may include a camera 1005 (e.g., including a lens, an aperture, and an imaging sensor) and a flash 1010 integrated into back 1002 (or elsewhere) of device 1000. In other examples, camera 1005 and flash 1010 may be integrated into front 1001 of device 1000 or both front and back cameras may be provided. Camera 1005 and flash 1010 may be components of a camera module to originate image data processed into streaming video that is output to display 1004 and/or communicated remotely from device 1000 via antenna 1008 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following embodiments pertain to further embodiments.

In one or more first embodiments, a computer-implemented method for video coding comprises determining one or more long term reference pictures for a sequence of pictures, adjusting a rate control based quantization parameter for an individual long term reference picture of the long term reference pictures to generate a coding quantization parameter for the individual long term reference picture, coding the individual long term reference picture based on the coding quantization parameter, generating a reference picture list syntax comprising an indicator to insert the individual long term reference picture into a long term reference picture list when the individual long term reference picture is replaced in a short term reference picture list by another picture, and providing the coded individual long term reference picture and the reference picture list syntax in a bitstream.

Further to the first embodiments, determining the one or more long term reference pictures comprises at least one of assigning all intra-pictures of the sequence of pictures as long term reference pictures, assigning all detected scene change pictures of the sequence of pictures as long term reference pictures, or assigning long term reference pictures at a predetermined interval.

Further to the first embodiments, determining the one or more long term reference pictures comprises assigning long term reference pictures at an interval, wherein the method further comprises: determining the interval based on multiplying a group of picture size of the sequence of pictures and a predetermined multiplier.

Further to the first embodiments, adjusting the rate control based quantization parameter comprises reducing the rate control based quantization parameter by an adjustment factor determined based on a temporal correlation associated with the individual long term reference picture.

Further to the first embodiments, the method further comprises determining an adjustment factor to adjust the rate control based quantization parameter to the coding quantization parameter, wherein the adjustment factor is based on at least one of a ratio of a number of small motion blocks to a total number of blocks for one or more pictures of the sequence of pictures or a prediction distortion cost corresponding to the one or more pictures of the sequence of pictures.

Further to the first embodiments, the method further comprises adjusting a second rate control based quantization parameter for a second long term reference picture of the long term reference pictures to generate a second coding quantization parameter for the second individual long term reference picture, wherein the coding quantization parameter is less than the second coding quantization parameter based on the individual long term reference picture having a higher temporal correlation than the second long term reference picture.

Further to the first embodiments, the indicator is to indicate insertion of the individual long term reference picture into the long term reference picture list when the individual long term reference picture is replaced in both a short term backward reference picture list and a short term forward reference picture list.

Further to the first embodiments, the reference picture list syntax further comprises a second indicator to insert the individual long term reference picture into the short term reference picture list immediately responsive to the coding of the individual long term reference picture.

Further to the first embodiments, the reference picture list syntax further comprises a second indicator to insert the individual long term reference picture into the short term reference picture list immediately responsive to the coding of the individual long term reference picture and the indicator is to indicate replacement of a previous long term reference picture by the individual long term reference picture in the long term reference picture list.

Further to the first embodiments, the bitstream comprises at least one of an advanced video coding (AVC), a high efficiency video coding (HEVC), a VP8, or a VP9 compliant bitstream.

Further to the first embodiments, the reference picture list syntax further comprises a second indicator to insert the individual long term reference picture into the short term reference picture list immediately responsive to the coding of the individual long term reference picture and/or the indicator is to indicate replacement of a previous long term reference picture by the individual long term reference picture in the long term reference picture list and/or the bitstream comprises at least one of an advanced video coding (AVC), a high efficiency video coding (HEVC), a VP8, or a VP9 compliant bitstream.

In one or more second embodiments, system for video coding comprises a memory to store a sequence of pictures and a processor coupled to the memory, the processor to determine one or more long term reference pictures for the sequence of pictures, to adjust a rate control based quantization parameter for an individual long term reference picture of the long term reference pictures to generate a coding quantization parameter for the individual long term reference picture, to code the individual long term reference picture based on the coding quantization parameter, to generate a reference picture list syntax comprising an indicator to insert the individual long term reference picture into a long term reference picture list when the individual long term reference picture is replaced in a short term reference picture list by another picture, and to provide the coded individual long term reference picture and the reference picture list syntax in a bitstream.

Further to the second embodiments, the processor to determine the one or more long term reference pictures comprises at least one of the processor to assign all intra-pictures of the sequence of pictures as long term reference pictures, the processor to assign all detected scene change pictures of the sequence of pictures as long term reference pictures, or the processor to assign long term reference pictures at a predetermined interval.

Further to the second embodiments, the processor to determine the one or more long term reference pictures comprises the processor to assign long term reference pictures at an interval, wherein the processor is further to determine the interval based on multiplying a group of picture size of the sequence of pictures and a predetermined multiplier.

Further to the second embodiments, the processor to adjust the rate control based quantization parameter comprises the processor to reduce the rate control based quantization parameter by an adjustment factor determined based on a temporal correlation associated with the individual long term reference picture.

Further to the second embodiments, the processor is to determine an adjustment factor to adjust the rate control based quantization parameter to the coding quantization parameter, wherein the adjustment factor is based on at least one of a ratio of a number of small motion blocks to a total number of blocks for one or more pictures of the sequence of pictures or a prediction distortion cost corresponding to the one or more pictures of the sequence of pictures.

Further to the second embodiments, the processor is to adjust a second rate control based quantization parameter for a second long term reference picture of the long term reference pictures to generate a second coding quantization parameter for the second individual long term reference picture, wherein the coding quantization parameter is less than the second coding quantization parameter based on the individual long term reference picture having a higher temporal correlation than the second long term reference picture.

Further to the second embodiments, the indicator is to indicate insertion of the individual long term reference picture into the long term reference picture list when the individual long term reference picture is replaced in both a short term backward reference picture list and a short term forward reference picture list.

Further to the second embodiments, the reference picture list syntax further comprises a second indicator to insert the individual long term reference picture into the short term reference picture list immediately responsive to the coding of the individual long term reference picture.

Further to the second embodiments, the reference picture list syntax further comprises a second indicator to insert the individual long term reference picture into the short term reference picture list immediately responsive to the coding of the individual long term reference picture and the indicator is to indicate replacement of a previous long term reference picture by the individual long term reference picture in the long term reference picture list.

Further to the second embodiments, the indicator is to indicate insertion of the individual long term reference picture into the long term reference picture list when the individual long term reference picture is replaced in both a short term backward reference picture list and a short term forward reference picture list and/or the reference picture list syntax further comprises a second indicator to insert the individual long term reference picture into the short term reference picture list immediately responsive to the coding of the individual long term reference picture.

Further to the second embodiments, the bitstream comprises at least one of an advanced video coding (AVC), a high efficiency video coding (HEVC), a VP8, or a VP9 compliant bitstream.

In one or more third embodiments, a system comprises means for determining one or more long term reference pictures for a sequence of pictures, means for adjusting a rate control based quantization parameter for an individual long term reference picture of the long term reference pictures to generate a coding quantization parameter for the individual long term reference picture, means for coding the individual long term reference picture based on the coding quantization parameter, means for generating a reference picture list syntax comprising an indicator to insert the individual long term reference picture into a long term reference picture list when the individual long term reference picture is replaced in a short term reference picture list by another picture, and means for providing the coded individual long term reference picture and the reference picture list syntax in a bitstream.

Further to the third embodiments, the means for determining the one or more long term reference pictures comprises at least one of means for assigning all intra-pictures of the sequence of pictures as long term reference pictures, means for assigning all detected scene change pictures of the sequence of pictures as long term reference pictures, or means for assigning long term reference pictures at a predetermined interval.

Further to the third embodiments, the system further comprises means for determining an adjustment factor to adjust the rate control based quantization parameter to the coding quantization parameter, wherein the adjustment factor is based on at least one of a ratio of a number of small motion blocks to a total number of blocks for one or more pictures of the sequence of pictures or a prediction distortion cost corresponding to the one or more pictures of the sequence of pictures.

Further to the third embodiments, the system further comprises means for adjusting a second rate control based quantization parameter for a second long term reference picture of the long term reference pictures to generate a second coding quantization parameter for the second individual long term reference picture, wherein the coding quantization parameter is less than the second coding quantization parameter based on the individual long term reference picture having a higher temporal correlation than the second long term reference picture.

Further to the third embodiments, the indicator is to indicate insertion of the individual long term reference picture into the long term reference picture list when the individual long term reference picture is replaced in both a short term backward reference picture list and a short term forward reference picture list.

Further to the third embodiments, the reference picture list syntax further comprises a second indicator to insert the individual long term reference picture into the short term reference picture list immediately responsive to the coding of the individual long term reference picture.

In one or more fourth embodiments, at least one machine readable medium comprises a plurality of instructions that, in response to being executed on a computing device, cause the computing device to perform video coding by determining one or more long term reference pictures for a sequence of pictures, adjusting a rate control based quantization parameter for an individual long term reference picture of the long term reference pictures to generate a coding quantization parameter for the individual long term reference picture, coding the individual long term reference picture based on the coding quantization parameter, generating a reference picture list syntax comprising an indicator to insert the individual long term reference picture into a long term reference picture list when the individual long term reference picture is replaced in a short term reference picture list by another picture, and providing the coded individual long term reference picture and the reference picture list syntax in a bitstream.

Further to the fourth embodiments, determining the one or more long term reference pictures comprises at least one of assigning all intra-pictures of the sequence of pictures as long term reference pictures, assigning all detected scene change pictures of the sequence of pictures as long term reference pictures, or assigning long term reference pictures at a predetermined interval.

Further to the fourth embodiments, the machine readable medium further comprises a plurality of instructions that, in response to being executed on the computing device, cause the computing device to perform video coding by determining an adjustment factor to adjust the rate control based quantization parameter to the coding quantization parameter, wherein the adjustment factor is based on at least one of a ratio of a number of small motion blocks to a total number of blocks for one or more pictures of the sequence of pictures or a prediction distortion cost corresponding to the one or more pictures of the sequence of pictures.

Further to the fourth embodiments, the machine readable medium further comprises a plurality of instructions that, in response to being executed on the computing device, cause the computing device to perform video coding by adjusting a second rate control based quantization parameter for a second long term reference picture of the long term reference pictures to generate a second coding quantization parameter for the second individual long term reference picture, wherein the coding quantization parameter is less than the second coding quantization parameter based on the individual long term reference picture having a higher temporal correlation than the second long term reference picture.

Further to the fourth embodiments, the indicator is to indicate insertion of the individual long term reference picture into the long term reference picture list when the individual long term reference picture is replaced in both a short term backward reference picture list and a short term forward reference picture list.

Further to the fourth embodiments, the reference picture list syntax further comprises a second indicator to insert the individual long term reference picture into the short term reference picture list immediately responsive to the coding of the individual long term reference picture.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for video coding comprising:
   determining first and second long term reference pictures for a sequence of pictures;
   reducing a first rate control based quantization parameter for the first long term reference picture by a first adjustment factor to generate a first coding quantization parameter for the first long term reference picture, wherein the first adjustment factor is based on a first temporal correlation for the first long term reference picture comprising a first ratio of a number of small motion blocks to a total number of blocks for a first plurality of pictures of the sequence of pictures temporally neighboring and including the first long term reference picture;
   reducing a second rate control based quantization parameter for the second long term reference picture by a second adjustment factor to generate a second coding quantization parameter for the second long term reference picture, wherein the second adjustment factor is based on a second temporal correlation for the second long term reference picture comprising a second ratio of a number of small motion blocks to a total number of blocks for a second plurality of pictures of the sequence of pictures temporally neighboring and including the second long term reference picture, wherein the first adjustment factor exceeds the second adjustment factor in response to the first temporal correlation exceeding the second temporal correlation;

coding the first and second long term reference pictures based on the first and second coding quantization parameters;

generating a reference picture list syntax comprising an indicator to insert the first long term reference picture into a long term reference picture list when the first long term reference picture is replaced in a short term reference picture list by another picture; and providing the coded first and second long term reference pictures and the reference picture list syntax in a bitstream.

2. The method of claim 1, wherein determining the first and second long term reference pictures comprises at least one of assigning all intra-pictures of the sequence of pictures as long term reference pictures, assigning all detected scene change pictures of the sequence of pictures as long term reference pictures, or assigning long term reference pictures at a predetermined interval.

3. The method of claim 1, wherein determining the one or more long term reference pictures comprises assigning long term reference pictures at an interval, wherein the method further comprises: determining the interval based on multiplying a group of picture size corresponding to the sequence of pictures and a predetermined multiplier.

4. The method of claim 1, wherein small motion blocks comprise blocks having a motion vector with a sum of an absolute value of a horizontal component an absolute value of a vertical component that is less than a threshold.

5. The method of claim 1, wherein the first and second adjustment factors are further based on prediction distortion costs of the first and second plurality of pictures, respectively.

6. The method of claim 1, wherein the first and second plurality of pictures comprise temporally future pictures with respect to the first and second long term reference pictures, respectively.

7. The method of claim 1, wherein the indicator is to indicate insertion of the first long term reference picture into the long term reference picture list when the first long term reference picture is replaced in both a short term backward reference picture list and a short term forward reference picture list.

8. The method of claim 1, wherein the reference picture list syntax further comprises a second indicator to insert the first long term reference picture into the short term reference picture list immediately responsive to the coding of the first long term reference picture.

9. The method of claim 8, wherein the indicator is to indicate replacement of a previous long term reference picture by the first long term reference picture in the long term reference picture list.

10. The method of claim 1, wherein the bitstream comprises at least one of an advanced video coding (AVC), a high efficiency video coding (HEVC), a VP8, or a VP9 compliant bitstream.

11. A system for video coding comprising:
a memory to store a sequence of pictures; and
a processor coupled to the memory, the processor to:
    determine first and second long term reference pictures for a sequence of pictures;
    reduce a first rate control based quantization parameter for the first long term reference picture by a first adjustment factor to generate a first coding quantization parameter for the first long term reference picture, wherein the first adjustment factor is based on a first temporal correlation for the first long term reference picture comprising a first ratio of a number of small motion blocks to a total number of blocks for a first plurality of pictures of the sequence of pictures temporally neighboring and including the first long term reference picture;
    reduce a second rate control based quantization parameter for the second long term reference picture by a second adjustment factor to generate a second coding quantization parameter for the second long term reference picture, wherein the second adjustment factor is based on a second temporal correlation for the second long term reference picture comprising a second ratio of a number of small motion blocks to a total number of blocks for a second plurality of pictures of the sequence of pictures temporally neighboring and including the second long term reference picture, wherein the first adjustment factor exceeds the second adjustment factor in response to the first temporal correlation exceeding the second temporal correlation;
    code the first and second long term reference pictures based on the first and second coding quantization parameters;
    generate a reference picture list syntax comprising an indicator to insert the first long term reference picture into a long term reference picture list when the first long term reference picture is replaced in a short term reference picture list by another picture; and
    provide the coded first and second long term reference pictures and the reference picture list syntax in a bitstream.

12. The system of claim 11, wherein the processor to determine the first and second long term reference pictures comprises at least one of the processor to assign all intra-pictures of the sequence of pictures as long term reference pictures, the processor to assign all detected scene change pictures of the sequence of pictures as long term reference pictures, or the processor to assign long term reference pictures at a predetermined interval.

13. The system of claim 11, wherein the first and second adjustment factors are further based on prediction distortion costs of the first and second plurality of pictures, respectively.

14. The system of claim 11, wherein the first and second plurality of pictures comprise temporally future pictures with respect to the first and second long term reference pictures, respectively.

15. The system of claim 11, wherein the indicator is to indicate insertion of the first long term reference picture into the long term reference picture list when the first long term reference picture is replaced in both a short term backward reference picture list and a short term forward reference picture list.

16. The system of claim 11, wherein the reference picture list syntax further comprises a second indicator to insert the first long term reference picture into the short term reference picture list immediately responsive to the coding of the first long term reference picture.

17. At least one computer usable memory comprising a plurality of instructions that, in response to being executed by the computer, cause the computer to perform video coding by:
  determining first and second long term reference pictures for a sequence of pictures;
  reducing a first rate control based quantization parameter for the first long term reference picture by a first adjustment factor to generate a first coding quantization parameter for the first long term reference picture, wherein the first adjustment factor is based on a first temporal correlation for the first long term reference picture comprising a first ratio of a number of small motion blocks to a total number of blocks for a first plurality of pictures of the sequence of pictures temporally neighboring and including the first long term reference picture;
  reducing a second rate control based quantization parameter for the second long term reference picture by a second adjustment factor to generate a second coding quantization parameter for the second long term reference picture, wherein the second adjustment factor is based on a second temporal correlation for the second long term reference picture comprising a second ratio of a number of small motion blocks to a total number of blocks for a second plurality of pictures of the sequence of pictures temporally neighboring and including the second long term reference picture, wherein the first adjustment factor exceeds the second adjustment factor in response to the first temporal correlation exceeding the second temporal correlation;
  coding the first and second long term reference pictures based on the first and second coding quantization parameters;
  generating a reference picture list syntax comprising an indicator to insert the first long term reference picture into a long term reference picture list when the first long term reference picture is replaced in a short term reference picture list by another picture; and
  providing the coded first and second long term reference pictures and the reference picture list syntax in a bitstream.

18. The computer usable memory of claim 17, wherein determining the first and second term reference pictures comprises at least one of assigning all intra-pictures of the sequence of pictures as long term reference pictures, assigning all detected scene change pictures of the sequence of pictures as long term reference pictures, or assigning long term reference pictures at a predetermined interval.

19. The computer usable memory of claim 17, wherein the first and second adjustments are further based on prediction distortion costs of the first and second plurality of pictures, respectively.

20. The computer usable memory of claim 17, wherein the first and second plurality of pictures comprise temporally future pictures with respect to the first and second long term reference pictures, respectively.

21. The computer usable memory of claim 17, wherein the indicator is to indicate insertion of the first long term reference picture into the long term reference picture list when the first long term reference picture is replaced in both a short term backward reference picture list and a short term forward reference picture list.

22. The computer usable memory of claim 17, wherein the reference picture list syntax further comprises a second indicator to insert the first long term reference picture into the short term reference picture list immediately responsive to the coding of the first long term reference picture.

* * * * *